(12) United States Patent
Kawamoto (10) Patent No.: US 7,549,587 B2
(45) Date of Patent: Jun. 23, 2009

(54) SCAN ENGINE WITH BUILT-IN AUTO TRIGGER (75) Inventor: Hironori Kawamoto, Kawaguchi (JP)

(73) Assignee: Optoelectronics Co., Ltd., Saitama Pref. (JP)

( * ) Notice: Subject to any disclaimer, the term of this patent is extended or adjusted under 35 U.S.C. 154(b) by 214 days.

(21) Appl. No.: 11/270,015

(22) Filed: Nov. 9, 2005

(65) Prior Publication Data

US 2007/0102524 A1    May 10, 2007

(51) Int. Cl.
*G06K 7/10* (2006.01)
(52) U.S. Cl. .............................. 235/472.01; 235/462.25
(58) Field of Classification Search .................
235/472.01–472.03, 462.01–462.45, 470, 235/454, 455
See application file for complete search history.

(56) References Cited

U.S. PATENT DOCUMENTS

| 4,933,538 A | * | 6/1990 | Heiman et al. | 235/462.31 |
| 5,260,553 A | * | 11/1993 | Rockstein et al. | 235/462.01 |
| 5,381,438 A | | 1/1995 | Guo et al. | |
| 5,484,992 A | * | 1/1996 | Wilz et al. | 235/462.08 |
| 5,561,283 A | * | 10/1996 | Dvorkis et al. | 235/462.09 |
| 5,699,180 A | * | 12/1997 | Urakawa et al. | 359/208 |
| 5,750,976 A | * | 5/1998 | Eastman et al. | 235/462.36 |
| 5,804,809 A | * | 9/1998 | Eastman et al. | 235/462.42 |
| 6,484,944 B1 | * | 11/2002 | Manine et al. | 235/462.38 |
| 6,981,645 B2 | * | 1/2006 | Leach | 235/462.25 |

FOREIGN PATENT DOCUMENTS

| JP | 06-123851 A | 5/1994 |
| JP | 2001-308439 A | 11/2001 |
| WO | WO 03/019463 A | 3/2003 |

OTHER PUBLICATIONS

International Search Report and Written Opinion, Sep. 23, 2004.

* cited by examiner

*Primary Examiner*—Thien M Le
(74) *Attorney, Agent, or Firm*—Kaplan Gilman & Pergament LLP (57) ABSTRACT A method and system for scanning objects using a scan engine having two modes are described. Under a first mode, the scan engine generates modulated pulses for determining the existence of objects containing symbols such as barcode and a scanning mirror is kept stationary. When it is determined that a triggering event should occur or the symbols exit, the scan engine is switched to a second mode in which light is continuously generated by a light source and used with the scanning mirror oscillating for standard scanning.

18 Claims, 7 Drawing Sheets (PRIOR ART)
FIG. 1

BARCODE SCANNING MODE

SCAN ENGINE WITH BUILT-IN AUTO TRIGGER

BACKGROUND OF THE INVENTION

1. Field of the Invention

The present invention generally relates to scan engines, more particularly, relates to a scan engine with a built-in auto trigger.

2. Description of the Related Art

Scan engines used for scanning symbols having data identifying characteristics such as barcodes are known. Further, manual triggers used in scan systems are known. For example U.S. Pat. No. 5,329,106 to Hone et al describes a handle-less barcode scanning system with a manually actuated trigger on the printed circuit board.

Figure 1:
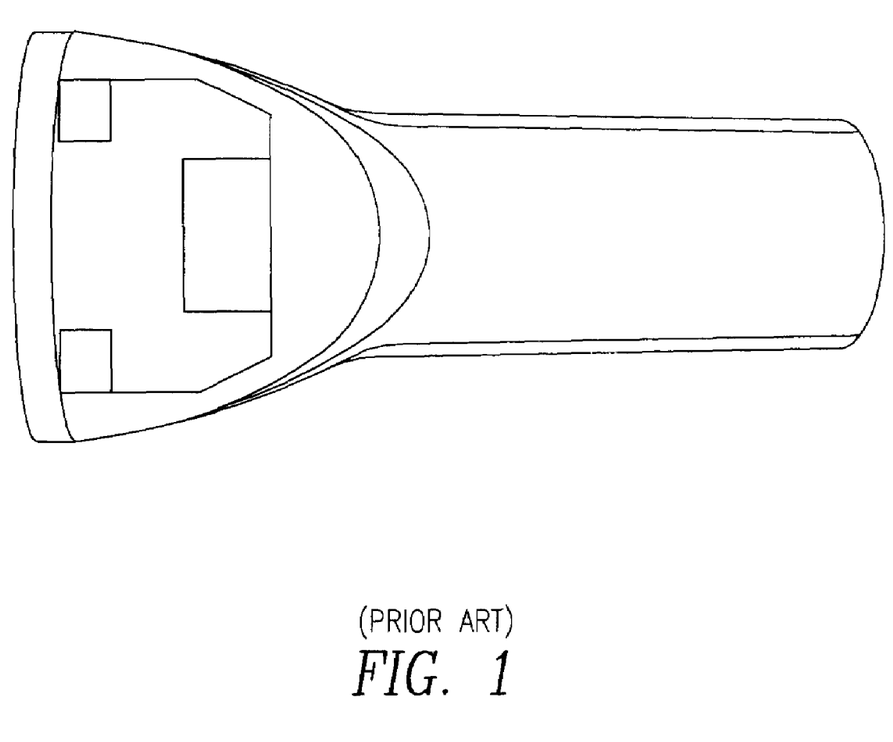
FIG. 1 depicts a prior art scan system.

Scanning systems with separate trigger devices are known. As shown in FIG. 1, a prior art auto trigger optical system is shown. A separate and independent auto trigger subsystem to the scanning system is shown. A separate light emitting diode (LED) used for triggering purposes is suitably positioned within a hand held barcode code scanner. The scanner contains a separate scan engine therein. The trigger LED emits light, which when reflected from a desired barcode type, is detected or received by a photo detector (PD). The reflected light input to the PD is transformed into an electronic signal, which in turn is processed by a processor (not shown) causing the scan engine to initiate desired barcode scanning.

Figure 2:
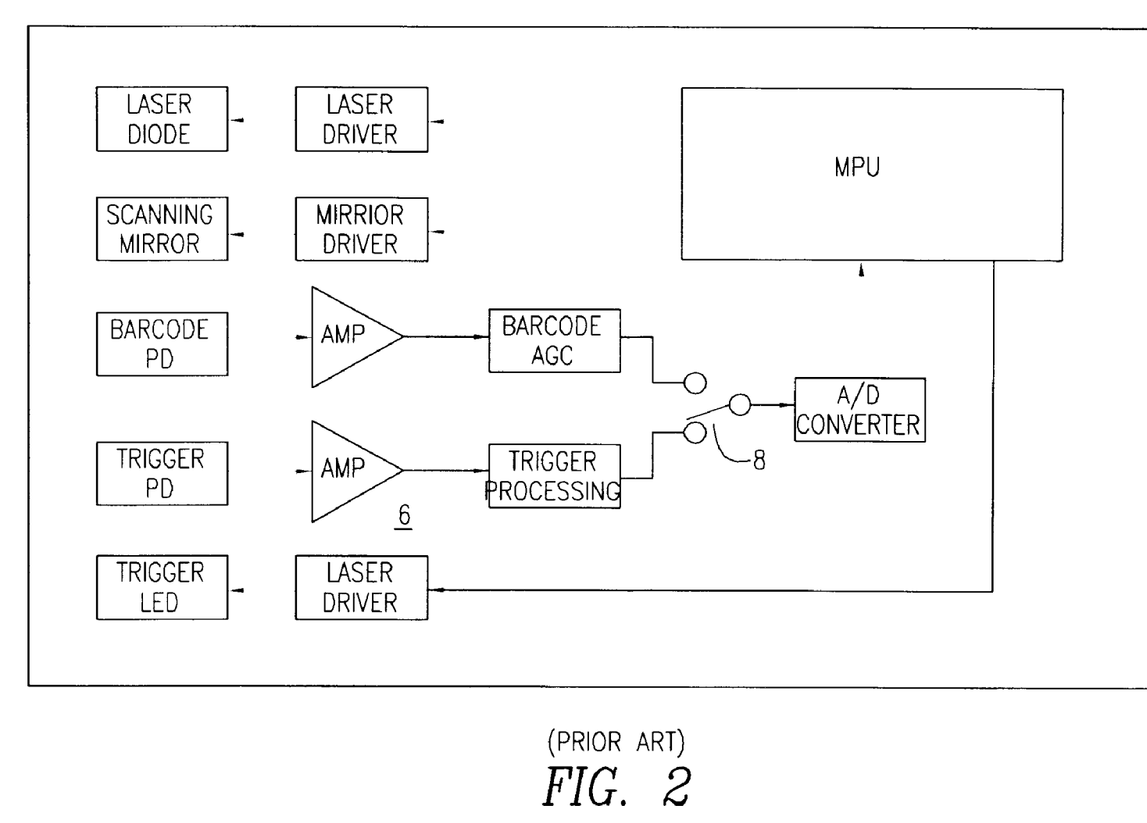
FIG. 2 depicts a block diagram of the prior art scan system of FIG. 1.

FIG. 2 is a block diagram of the prior art scanning system showing a separate path for the trigger subsystem 6. A separate barcode PD and a separate trigger PD are used for triggering and barcode reading respectively. Note that a switch 8 is used to switch between a trigger subsystem 6 and the barcode scanning system.

As can be seen, known systems use separate and independent triggering optical components. The separate and independent component each has dimension and takes up space. For example, the components may be placed besides the barcode scanning optical path. Further, an extra circuit board may be required for placing the component and the wirings associated therewith. More components necessarily lower the life span of the scanner in that the failure of one component disrupts the operation of the entire system.

Therefore, it is desirable to have a scan system free of the separate and independent triggering optical components described supra. It is further desired to have the scan system with a triggering function achieved efficiently using the existing components of a scan engine.

SUMMARY OF THE INVENTION

The present invention generally provides a scan engine with a built-in auto trigger.

The present invention further provides a scan engine free of manual trigger actions.

The present invention still further provides hands free scanning such as using a reader located in a fixed position.

The present invention yet further provides lower power consumption during non-operational periods by periodically generating light pulses instead of continuously using the light pulses.

The present invention yet still further provides lengthened life span for scanning light source such as laser diodes due to the provisioning of non-operational periods between pulses.

The present invention additionally provides auto trigger scanning with the scanning mirror in stationary position, thereby extends the life span of the scanning mirror mechanism.

A method for identifying symbols having data identifying characteristics is provided. The method includes the steps of providing a scan engine, which has a light source for scanning the symbols and generating a light, a light receiver for receiving the generated light when reflected back from the symbols, and an oscillatable mirror interposed between the light source and the light receiver in relation to a light path. The method further includes the step of maintaining the oscillatable mirror in a stationary state so that it can detect the existence of an item in close proximity potentially having a barcode or other symbol to be read; and turning on the scanning engine to scan for symbols when such an item is detected.

A barcode scanning system for identifying symbols having data identifying characteristics is provided. The system has a scan engine that has a light source for scanning the symbols and generating a light, a light receiver for receiving the generated light when reflected back from the symbols, and an oscillatable mirror interposed between the light source and the light receiver in relation to a light path. The system further includes a controller for maintaining the oscillatable mirror in a stationary state, until an object potentially having a barcode is detected for scanning, at which time the scanning operation is activated.

During the stationary state, a driving signal provides illumination of the laser only during a prescribed duty cycle and with a prescribed frequency, so power is saved and the danger of a constantly focused laser is avoided.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention relates to using the same scanning path for both barcode scanning and the detection of the existence of barcode or objects containing barcodes. Referring to FIGS. 3-7, a preferred embodiment of the present invention is described.

Figure 3:
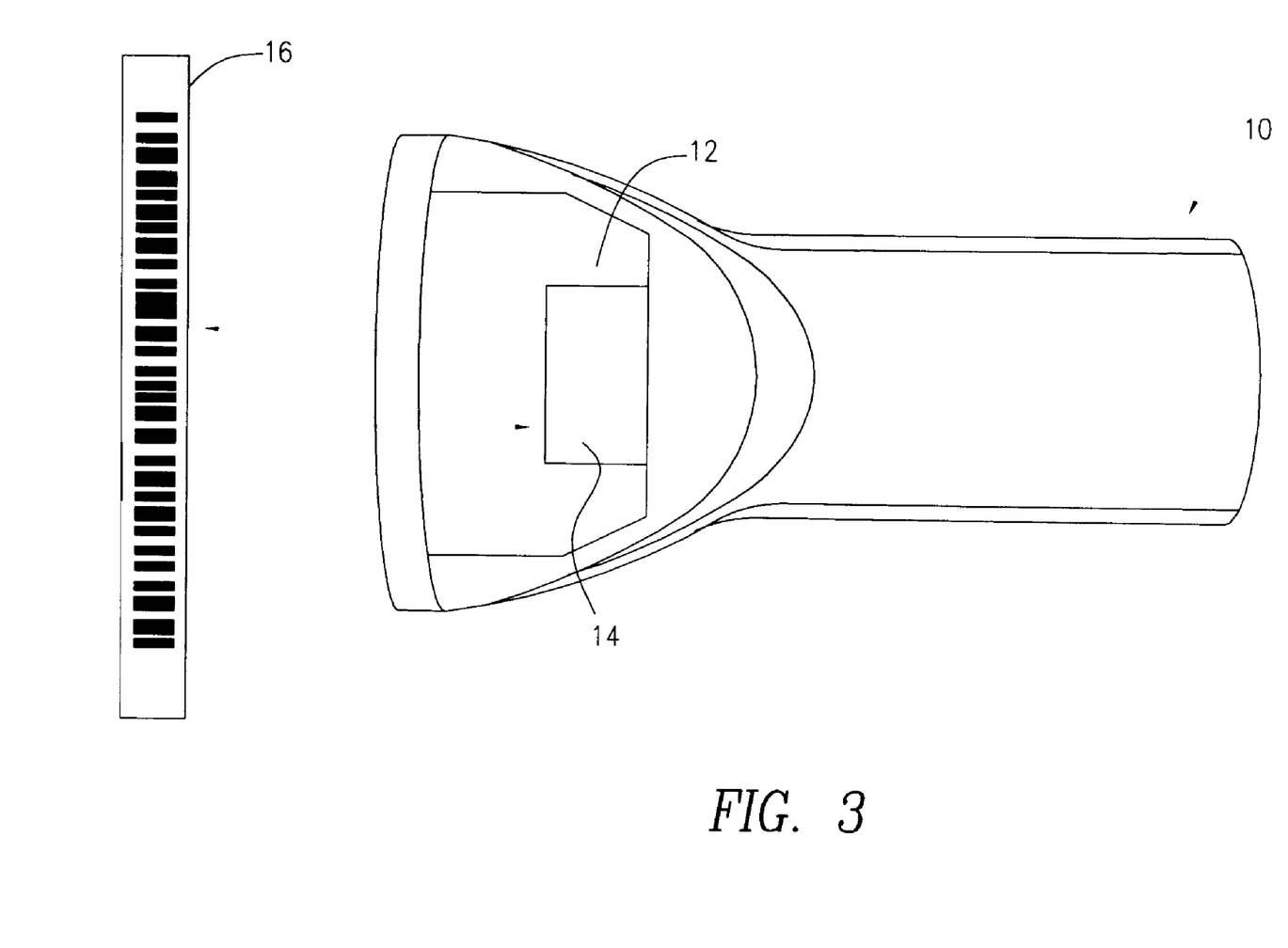
FIG. 3 depicts an auto trigger scan system of the present invention.

Referring now to FIG. 3, a scanning system having a hand held scanner 10 including a scan engine 12 is described. No triggering device such as the photo detector in FIG. 1 is required. Scan engine 12 is used for scanning symbols such as a barcode 16. In addition, scan engine 12 may be mounted on a circuit board 14 used for decoding, interfacing, or completing the functions of scanner 10.

Figure 4A:
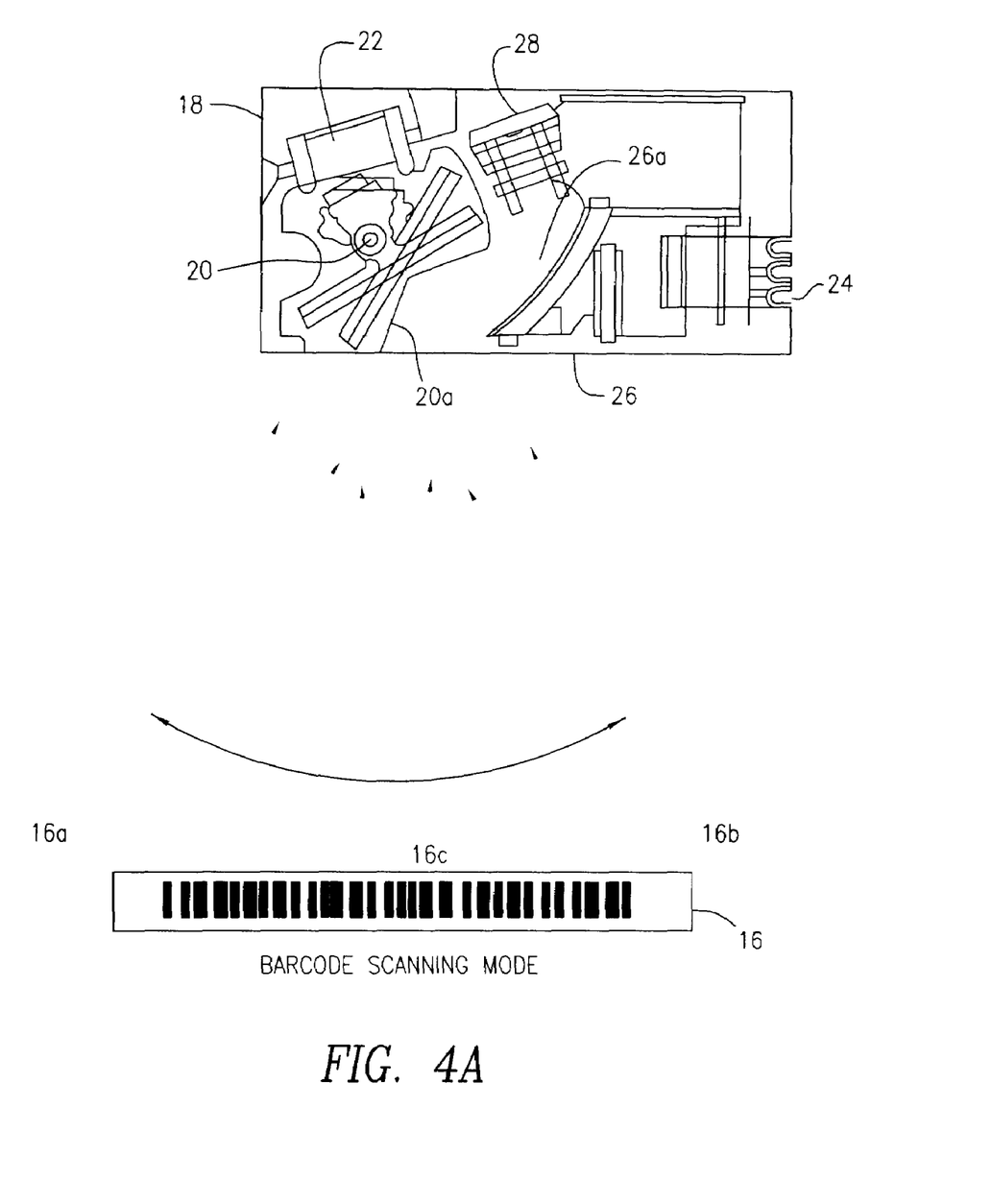
FIG. 4a is a first detailed depiction of FIG. 3.
Figure 4B:
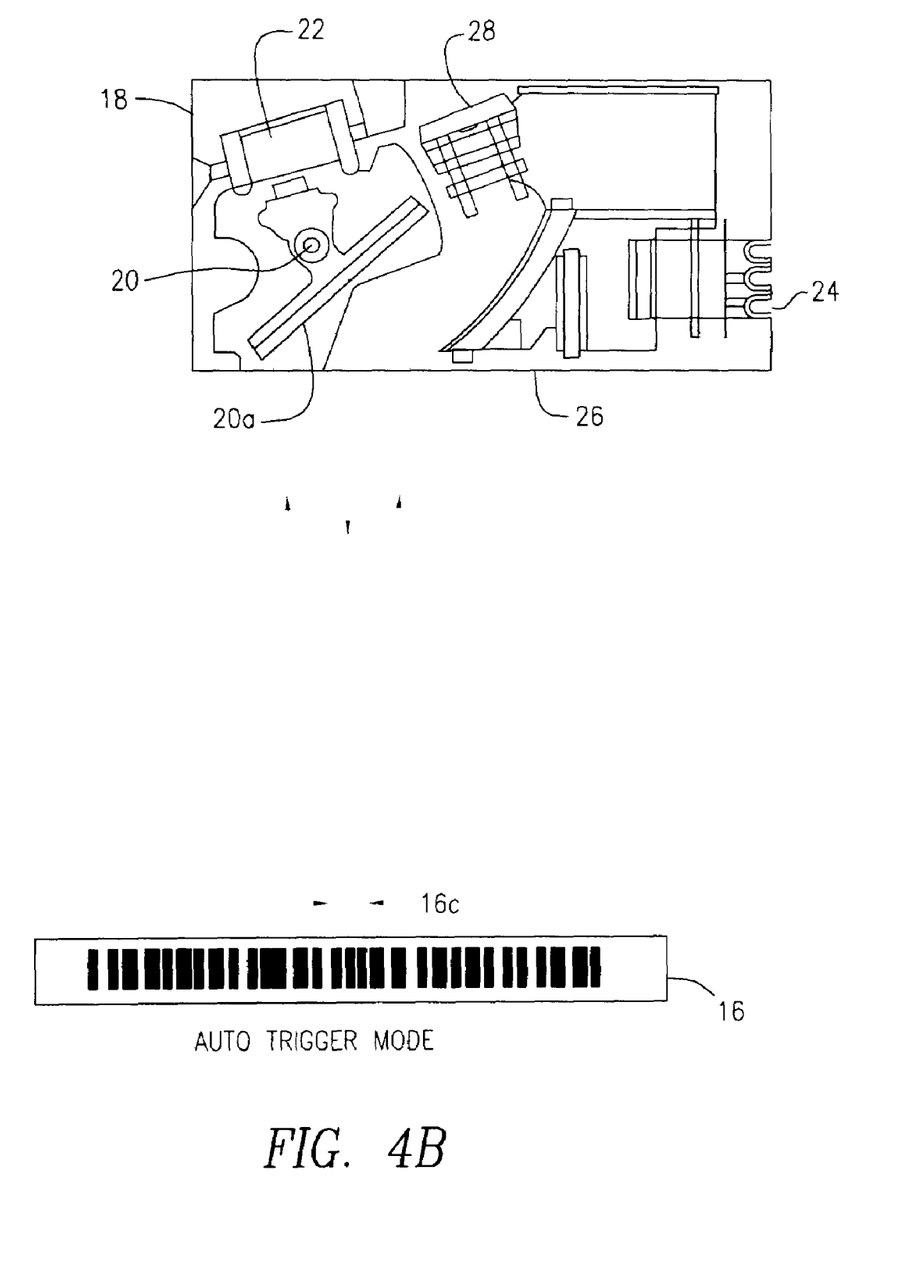
FIG. 4b is a second detailed depiction of FIG. 3.

Referring to FIGS. 4a-4b, a perspective view of a barcode scanning system is described. A mounting layer 18 which may be a circuit board 14 having the respective components mounted thereon is provided. An oscillating mirror 20 disposed to oscillate in relation to a center point is provided for reflecting light used in determining barcode information. Oscillating mirror 20 has a face 20a used specifically for reflecting light. An electromagnetic actuator 22 drives oscillating mirror 20. The electromagnetic actuator 22 in turn is controlled by a micro-controller unit (MPU) 30.

A laser diode assembly 24 is also mounted on mounting layer 18. Laser diode assembly 24 generates a series of laser pulses. In other words, depending upon circumstances, laser diode assembly 24 can operate in two modes, i.e. a discrete mode, and a continuous wave or pulsed mode both of which is discussed in detail infra. A stationary concave mirror 26 is positioned in front of the laser path. Mirror 26 has an aperture for permitting the laser to pass through to thereby reach face 20a, which in turn reflects the laser and directs the same to an object for scanning. If barcode 16 is detected, light is reflected back therefrom reaching oscillating mirror 20 which may be oscillating or stationary (non-oscillating) depending upon which mode of operation the system is operating. Oscillating mirror 20 reflects light onto a face 26a of mirror 26, which in turn reflects the laser onto a photo diode assembly 28.

Figure 5:
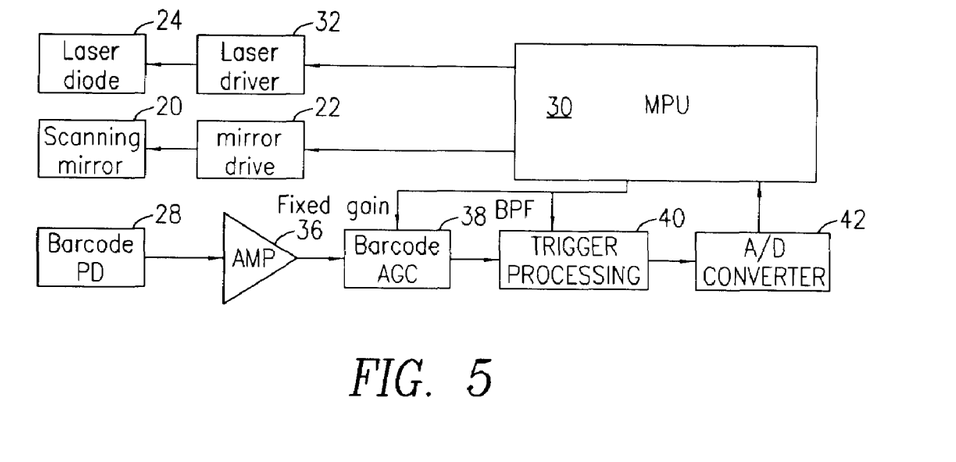
FIG. 5 depicts a block diagram of the present invention.

Referring to FIG. 5, a block diagram depicting a scan engine using the same barcode detection path for both auto triggering and barcode scanning is depicted. In other words, the same barcode detection path for later barcode data reading is also used for the initial determination process where an object having a barcode affixed thereon may movably pass through in relation to a scanner. A micro-processor unit 30 controls a laser driver 32 that drives laser diode 24. Laser diode assembly 32 operates exclusively in two modes discussed supra, i.e. the discrete mode and the continuous wave or pulsed mode. Micro-processor 30 further controls a mirror driver 22 that drives oscillating mirror 20. Photo diode assembly 28 is coupled to an amplifier 36, which is coupled to a barcode automatic gain controller (AGC) 38. A trigger processing block 40 is coupled to an analog-to-digital convector 42 with the resultant converted digital signal fed into processor 30.

As can be seen, when oscillating mirror 20 oscillates, information from a broader range is received. For example, information contained from point 16a to point 16b including point 16c at a relatively center point can be received by oscillating mirror 20 due to its oscillation. In this way, the continuous wave or pulsed mode is achieved. In the continuous wave or pulsed or barcode scanning mode, the laser diode 24 radiates light pulses are applied continuously in time or pulsed in higher frequency so that the reflected light that contains the barcode information is substantially scanned in for a complete barcode information processing. Further, in the barcode scanning mode, the scanning mirror 20 oscillates such that the complete barcode information can be scanned. The reflected light patterns of the barcode are received or collected on photo diode 28 via collecting mirror 26. Photo diode 28 in turn transforms the light patterns into electronic signals which are further amplified to a desired or constant level by the AGC 38. The amplified electronic barcode signal is further converted to a digital signal by the A/D converter 42, which outputs the digital signal for further processing by the MPU 30. In other words, barcode reader can scan barcode either with continuous wave (without modulation) or with pulsed mode (with modulation). A "sweeping" action may be required for scanning. Therefore, the barcode reading is achieved via a continuous wave or pulsed mode sweeping over the object or barcode 16. While, on the other hand, in the discrete mode the laser is not sweeping but pinpointing with intermittent pulse. Furthermore, while the laser is on, the pulse can be further modulated as an option. As can be seen, 'sweeping' is the barcode scanning mode, and "not sweeping" is the trigger mode.

In the discrete or auto trigger mode, the laser diode periodically spurts out or radiates discrete light pulses. As an object moves past the scanner, or is placed by hand directly in front of it, the object will reflect light back to the stationary mirror, and trigger it to start scanning. Note that if the object moves past the scanner such as on a conveyor belt, the object may cause the trigger even though the barcode itself is not yet within the view of the scanner. On the other hand, if the object is placed in front of a hand held scanner, then the barcode may be within the initial filed of view used to trigger the scanner. This latter arrangement is shown in FIG. 4b.

Further, in the auto trigger mode, only information in the neighborhood of point 16c may be received by oscillating mirror 20 due to its non-oscillation as shown in FIG. 4b, in which one embodiment of the auto trigger mode of the present invention is described. In the auto trigger mode, scanning mirror 20 is kept stationary in a non-oscillating mode in that actuator 22 does not exert an actuating force upon oscillating mirror 20. Further, in the auto trigger mode, the laser diode radiates light pulsing and the sensing mirror is not oscillating. In other words, sensing mirror is kept stationary causing the dynamic sensing of only a limited portion of the scanning area, e.g. the neighborhood of point 16c.

In practice it is critical to read moving object with barcode attached thereon. Therefore, as explained briefly above, in the auto-trigger mode, the triggering point or event may not be limited to a point within the confines of a barcode. The triggering point may be a change in the reflected light. For example, in a conveyer belt transporting a number of boxes, the triggering point would be the point where the edge of a box comes into the purview of the scanner. The triggering beam associated with point 16c simply detects a change in object within the confine of barcode 16 and triggers the scanning operation, which should be sufficient to detect the existence of a barcode subject to scanning.

Alternatively, the trigger can be delayed until a specific signal indicating the presence of the barcode is detected. For example, if there are some or portions of a set of symbols having data identifying characteristics in front of the barcode reader, the reflected light patterns caused by the symbols are collected by the photodiode via the collecting mirror 26 in the same manner as during the barcode scanning mode. In addition, in the auto trigger mode, MPU 30 detects symbol derived signals at absolute levels or the variations of the absolute level. Therefore, AGC 38 is not necessary, although it may be used, in this mode in that MPU 30 sets AGC 38 in fixed gain state and the band path frequency in 100 kHz.

Figure 6:
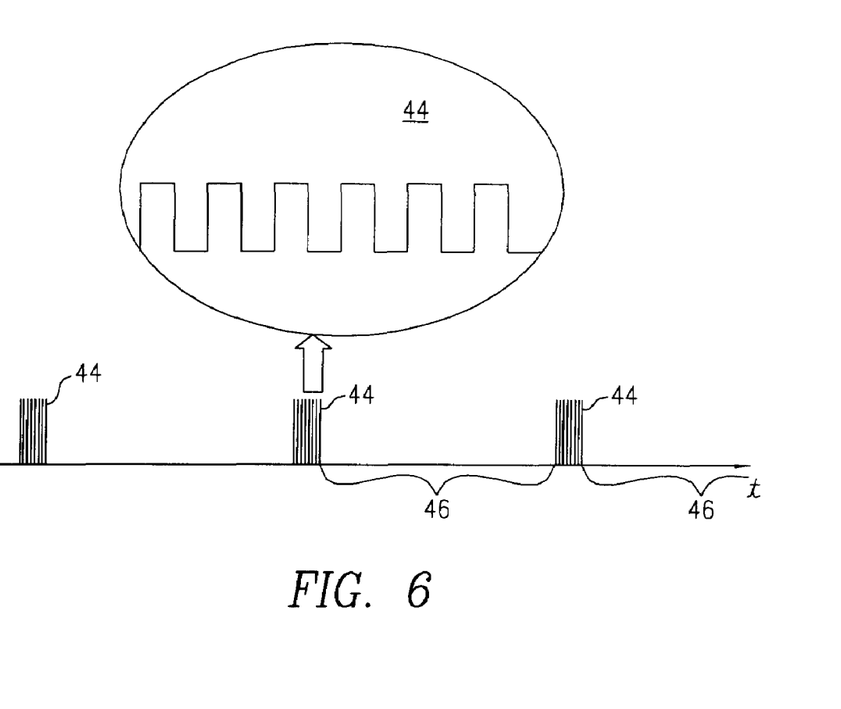
FIG. 6 depicts a timing diagram of the present invention.

Referring to FIG. 6, an exemplified timing diagram of the auto trigger mode is depicted. Pulsed laser 44 is generated periodically with the laser source inactive during periods 46. Pulses 44 are further modulated at a fixed frequency. The laser light is typically pulsed every 10 mSec with the pulse lasting 1 mSec. Further, the pulsed laser is modulated at a frequency of 100 kHz for anti-ambient light purposes. That is, the frequency during the pulse is set so that it will pass through a system that is designed to filter ambient light (This may also work for laser safety issues).

Figure 7:
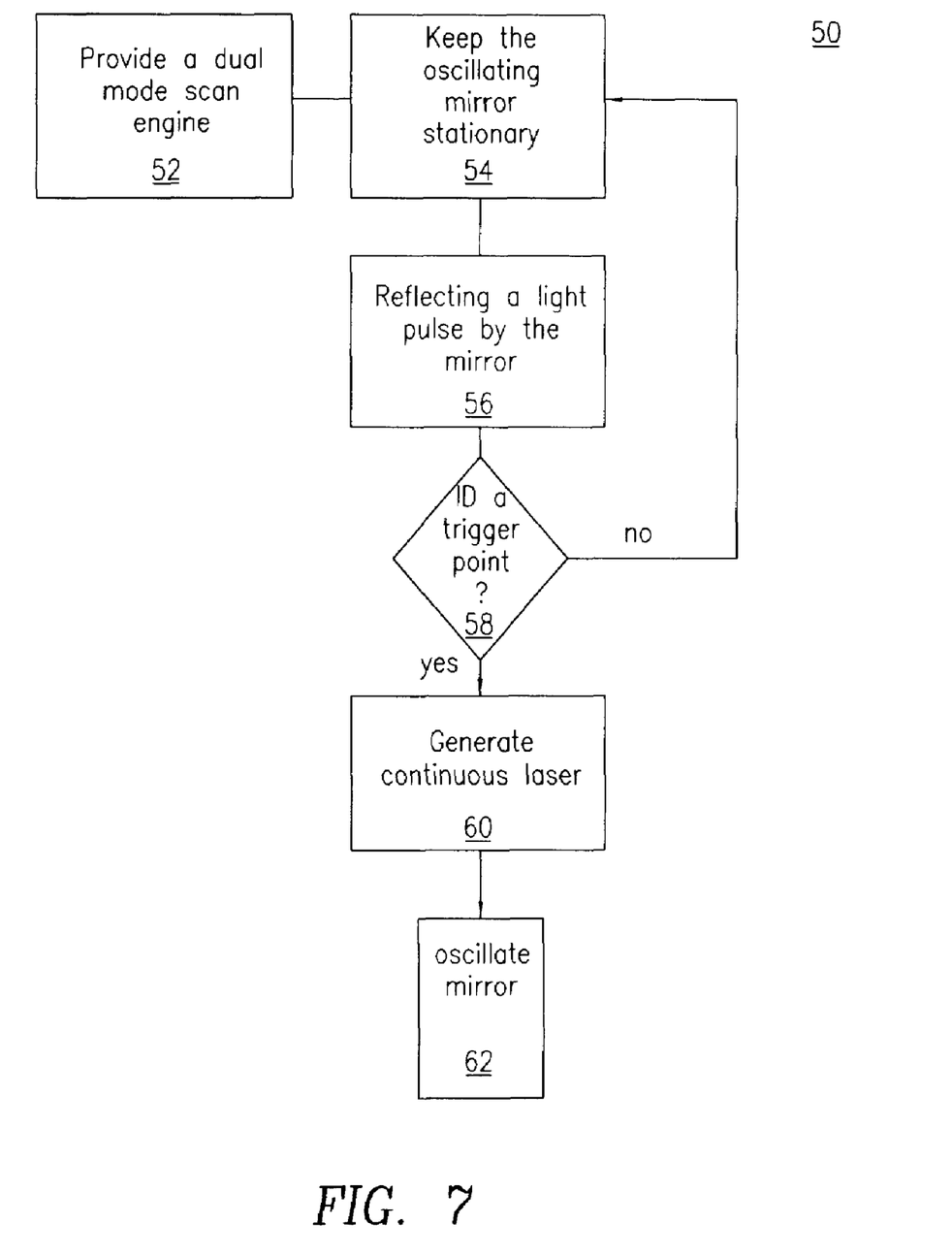
FIG. 7 depicts a flowchart of the present invention.

Referring to FIG. 7, a flowchart 50 is shown. A dual mode scan engine described supra is provided (step 52). The oscillating mirror 20 is kept non-moving or stationary before it is determined that barcode subject to scanning exits (step 54). A modulated pulse 44 is generated by laser diode 24 and reflected by the non-moving mirror 20 upon a symbol or an object (step 56). The next step is to identify a trigger event or point. If it is determined that a trigger event occurs, (step 58), continuous laser pulses are generated by laser diode 24 (step 60) and oscillating mirror moves (step 62) with both under the control of MPU 30. If no trigger event occurs, the system reverts back to step 54. Step 58 may be also arranged to simply determine the presence of an object. By way of an example, when conveyer belt having a number of objects such as boxes thereon moving at a speed, the triggering point may be the front edge of the box.

While the foregoing is directed to embodiments of the present invention, other and further embodiments of the invention may be devised without departing from the basic scope thereof, and the scope thereof is determined by the claims that follow.

What is claimed is:

1. A method for identifying symbols having data identifying characteristics, said method being performed with the use of a scan engine having a light source for scanning said symbols and generating a light, a light receiver receiving the generated light when reflected back from said symbols, and an oscillatable mirror interposed in a light path between said light source and said light receiver, said method comprising the steps of:
   maintaining said oscillatable mirror in a substantially stationary state, whereby only sufficient amount of information identifying the existence of said symbols is transferred by the reflected light;
   maintaining said light source in a mode wherein said light source is emits light only for a relatively small non-zero percentage of time; and
   determining whether sufficient amount of information identifying the existence of said symbols is transferred by the reflected light and
   upon determining, increasing the percentage of time said light source is active, and activating the oscillatable mirror to begin oscillation in response to said determining or said increasing.

2. The method of claim 1, further comprising oscillating said mirror for a complete scanning of said symbols.

3. The method of claim 1, further comprising causing said light source to generate the light in discrete pulses wherein said light source is driven by a signal pulsing it on and off, but wherein the duty cycle is greater during times that said oscillatable mirror is oscillating than at times when said oscillatable mirror is not oscillating.

4. The method of claim 3, wherein said light source is a laser.

5. The method of claim 3, wherein said light source is modulated to a fixed frequency.

6. The method of claim 1, wherein said oscillatable mirror is coupled to an electro-magnetic driver.

7. The method of claim 1, wherein said scan engine farther includes a second curved mirror for concentrating light information reflected by said oscillatable mirror.

8. The method of claim 1, wherein the determining step is based on reflected light coming from a sub-region having dimension substantially less than a region sufficient for identifying information represented by said symbols.

9. The method of claim 1, wherein said symbols comprise barcode.

10. A barcode scanning system for identifying symbols having data identifying characteristics, comprising:
    a scan engine comprising
    a light source for scanning said symbols and generating a light,
    a light receiver for receiving the generated light when reflected back from said symbols, and
    an oscillatable mirror interposed in a light path between said light source and said light receiver; and
    a controller maintaining said oscillatable mirror in a stationary state during a time when said scan engine is not reading a symbol, said controller also operable to cause said light source to emit intermittent pulses of light during said time when said scan engine is not reading a symbol; said controller also being operable to cause said oscillatable mirror to oscillate when a prescribed signal is received back in response to said pulses of light, and to increase a duty cycle associated with said light pulses when said mirror is caused to oscillate.

11. The system of claim 10, further comprising a driver for oscillating said mirror to cause a complete scanning of said symbol is oscillating it for a complete scanning of said symbols.

12. The system of claim 10, wherein said light source generates the light in discrete pulses.

13. The system of claim 12, wherein said light source is a laser.

14. The system of claim 12, further comprising a modulator causing said light to be modulated to a fixed frequency.

15. The system of claim 10, wherein said mirror is coupled to an electro-magnetic driver.

16. The system of claim 10, wherein said scan engine further comprises a curved mirror for concentrating light information reflected by said oscillatable mirror.

17. The system of claim 10, wherein said controller's determination is based on reflected light coming from a sub-region having dimension substantially less than a region sufficient for identifying information represented by said symbols.

18. The system of claim 10, constructed to detect symbols which comprise barcode.

* * * * *